United States Patent

Simpson et al.

[11] 3,903,412
[45] Sept. 2, 1975

[54] OPTICAL SYSTEMS AND ASSOCIATED DETECTING MEANS

[75] Inventors: George R. Simpson, South Woodstock; Henry B. Cole, East Woodstock, both of Conn.

[73] Assignee: American Optical Corporation, Southbridge, Mass.

[22] Filed: Feb. 21, 1961

[21] Appl. No.: 90,885

[52] U.S. Cl. ............................... 250/203; 102/70.2
[51] Int. Cl.[2] ........................................... G01J 1/20
[58] Field of Search .......... 88/1 M, 1 H (U.S. only), 88/57 SD, 1; 102/49, 50, 70.2; 250/209, 210, 203

[56] References Cited
UNITED STATES PATENTS

| | | | |
|---|---|---|---|
| 2,137,598 | 11/1938 | Vos ................................ | 102/70.2 P |
| 2,664,026 | 12/1953 | Kavanagh ......................... | 88/57 SD |
| 2,749,801 | 6/1956 | Clotar ............................. | 88/57 SD |
| 2,892,093 | 6/1959 | Henderson ........................ | 102/70.2 |

*Primary Examiner*—Samuel Feinberg
*Assistant Examiner*—Harold Tudor
*Attorney, Agent, or Firm*—H. R. Berkenstock, Jr.; William C. Nealon

EXEMPLARY CLAIM

1. In combination an opaque main supporting housing and a combined light-collecting and detecting system disposed within and surrounded by said main housing at a location intermediate its spaced opposite ends, said combined system comprising a single set of similar relatively small peripherally arranged light apertures in side wall portions of said main housing and appreciably spaced from each other in such a predetermined manner as to have each light aperture face outwardly in a different azimuthal direction, and jointly simultaneously admitting into said housing light from all parts of two different predetermined endless annular object fields outwardly of said housing and in concentric relation to a longitudinal axis extending centrally through said housing, a pair of relatively small photosensitive detecting elements disposed respectively at spaced axial locations in said main housing and each being arranged to detect any appreciable change in light intensity occurring at any location in the respective endless annular object field associated therewith, a pair of optical systems associated with each light aperture, and each optically aligned with a respective one of said spaced detecting elements, and each of said optical systems comprising a plurality of specularly reflecting surfaces including a plane surface and a curved surface in optical alignment with each other, said plane surface being positioned within said housing in a plane substantially parallel to the light aperture associated therewith and at a location substantially midway between the aperture associated therewith and said central longitudinal axis, said curved surface being a concavely curved surface having its center of curvature disposed substantially upon said longitudinal axis, said plane surface being so disposed in said housing and relative to the light aperture associated therewith as to intercept substantially all of the light rays from the object field aligned therewith which enter said housing, and to reflect same toward said curved surface, and said curved surface being so disposed in said system as to receive said reflected light rays and direct same inwardly as a convergent bundle of light rays generally toward the detecting element associated therewith, and a pair of positive lens elements centrally disposed within said housing, and each in optical contact with one of said detecting elements so as to collect the light rays travelling beyond the curved surface aligned therewith and to direct same onto said detecting element associated therewith.

7 Claims, 5 Drawing Figures

INVENTORS
GEORGE R. SIMPSON
HENRY B. COLE
BY
ATTORNEYS

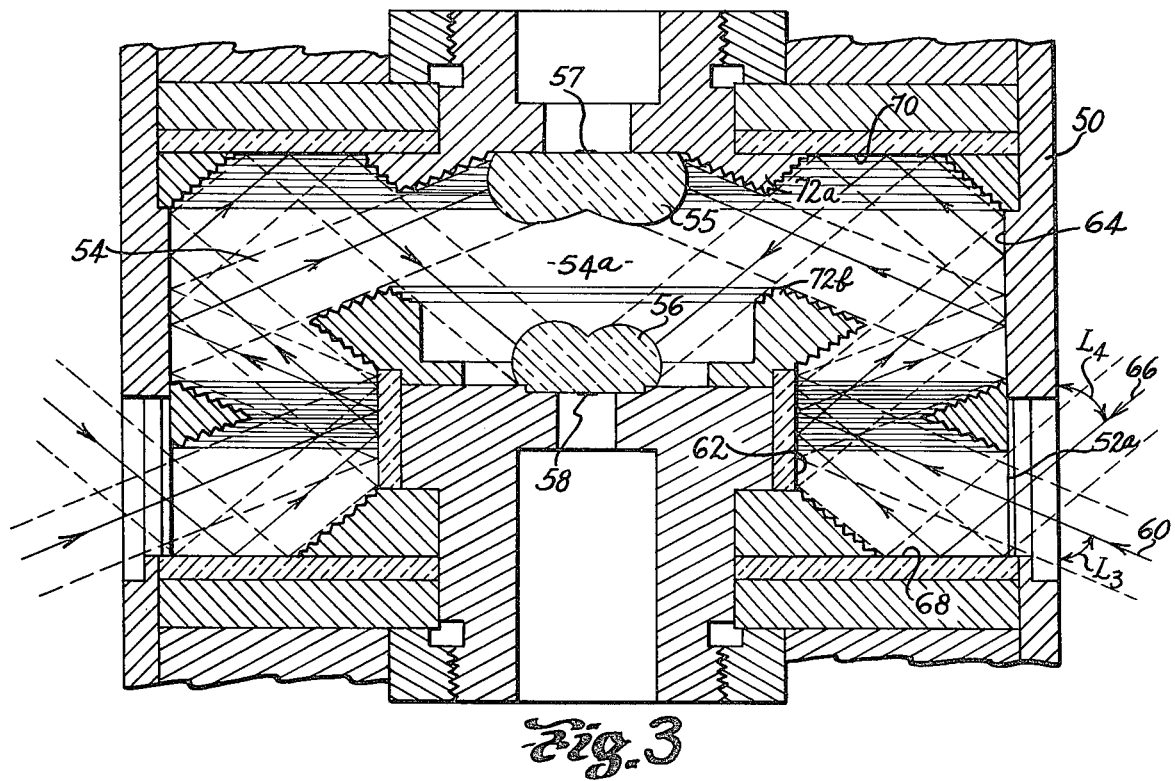
Fig. 3
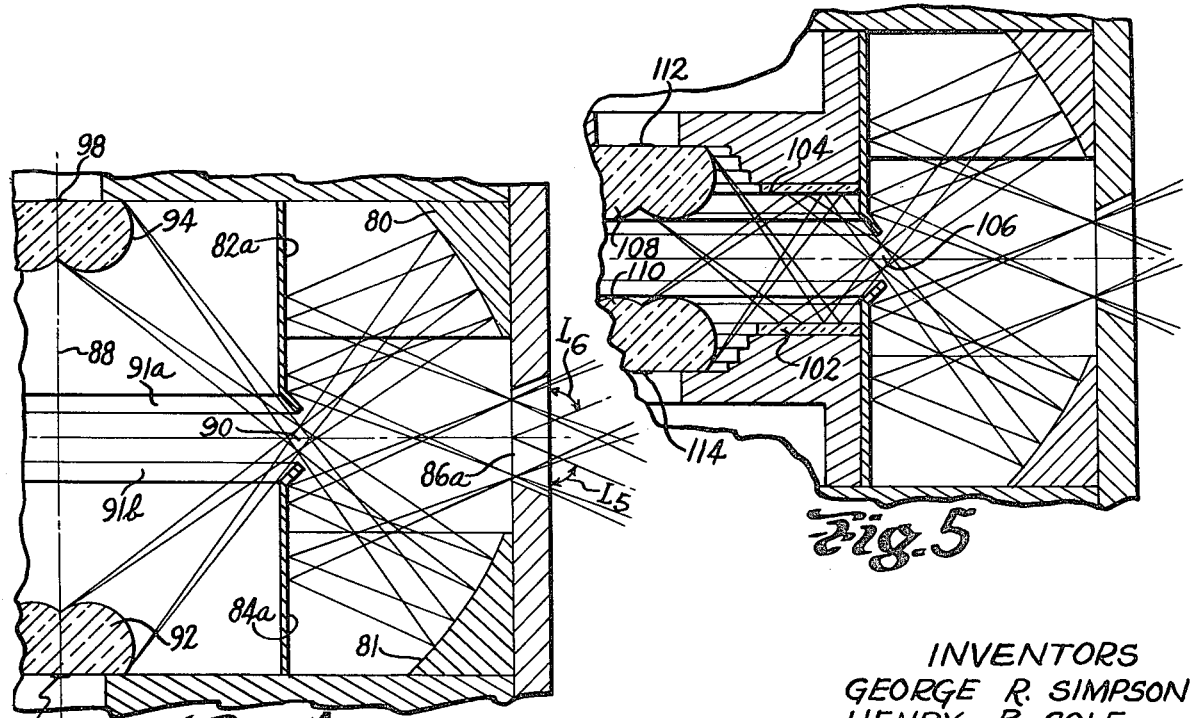
Fig. 4
Fig. 5

OPTICAL SYSTEMS AND ASSOCIATED DETECTING MEANS

This invention relates to a combined optical viewing and detecting system positioned within a main opaque supporting housing and arranged to view through a plurality of small peripherally spaced light apertures in side wall portions of said housing two different endless annular object fields outwardly of said housing and to simultaneously detect by the use of two different detecting means within the housing changes in radiation occurring in any part of either object field. More particularly, the invention relates to improvements in such a combined optical viewing and detecting system which will allow all parts of both annular object fields to be simultaneously viewed through a single set of peripherally spaced apertures as well as opaque means within the housing providing a gate or aperture which is common to the light paths from both object fields and is of such size as to exclude from the detecting means most of the stray light which enters the housing while admitting thereto the light from both object fields.

Such an improved construction and arrangement of parts as provided by the present invention has the distinct advantage of being able to reduce by one-half the number of light apertures which were formerly required for proper operation of such a combined two-object field viewing and detecting system, will block out and prevent most of the unwanted or stray light which enters the housing from reaching the inner regions of the housing and influencing the detecting means and allow the combined system to be disposed in much less space within the housing than has been possible heretofore when two separate annular viewing and detecting systems have been used; such as disclosed in copending application Ser. No. 685,062, filed Sept. 18, 1957, in the name of George R. Simpson et al.

The improved system for viewing two different endless annular object fields through a single set of peripherally spaced windows is accomplished by suitable reflecting means and aperture forming means disposed within the housing in such a manner that the paths of the light rays from each pair of corresponding sectors of the two spaced object fields fold back upon themselves and cross each other at least once within the housing and before reaching the two spaced detecting means associated therewith and without interfering with each other. Furthermore, because of this crossing of the light rays from the two object fields within the housing, it is possible to employ gate means or aperture-forming means in the vicinity of this crossing of the light paths in such a way that unwanted or stray light will be excluded from the inner regions of the housing and thus will not be allowed to influence the detecting means.

It is, accordingly, an object of the present invention to provide in side wall portions of a main opaque supporting housing a single set of small peripherally spaced light apertures as well as two different optical viewing and detecting systems within said housing and associated therewith in such a manner that all parts of two different endless annular object fields outwardly of the housing will be simultaneously viewed and changes in radiation occurring in any part of either detected.

It is an additional object of the invention to provide in such a combined system for viewing two separate annular object fields through a single set of peripherally spaced apertures, opaque means forming a gate or aperture means within the housing for excluding stray light from the detector region within the housing and from the detecting means located within this inner region within the housing.

It is a further object of the present invention to provide in such a combined optical viewing and detecting system for viewing two different object fields a construction and arrangement of parts which are compact and efficient, which are easy to make and assemble and which require less space, particularly insofar as the longitudinal dimensions of the housing are concerned than in double field annular optical viewing systems of earlier types.

Other objects and advantages of the invention will become apparent from the detailed description which follows when taken in conjunction with the accompanying drawing, in which:

FIG. 3 is a partial longitudinal sectional view somewhat similar to FIG. 1 but showing a modified form of the invention;

FIG. 4 is a partial longitudinal sectional view showing another modified form of the invention; and FIG. 5 is a partial longitudinal sectional view showing a further modified form of the invention.

Figure 1:
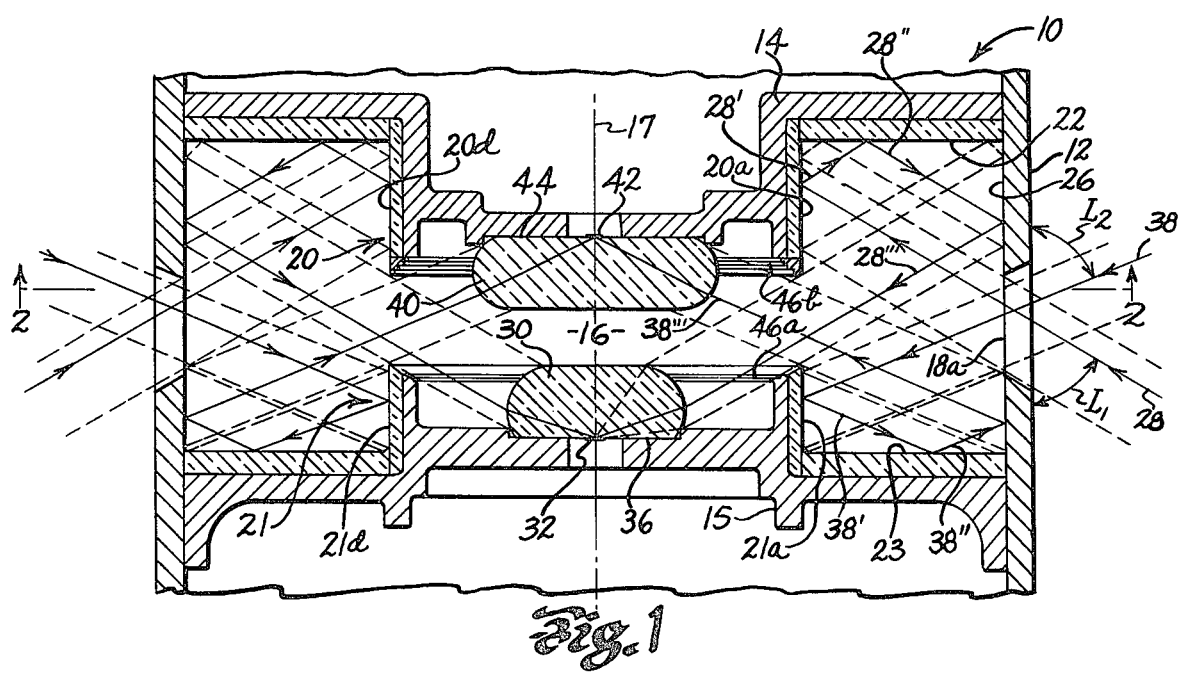
FIG. 1 is a longitudinal central sectional view taken through a part of a main supporting housing embodying the present invention.
Figure 2:
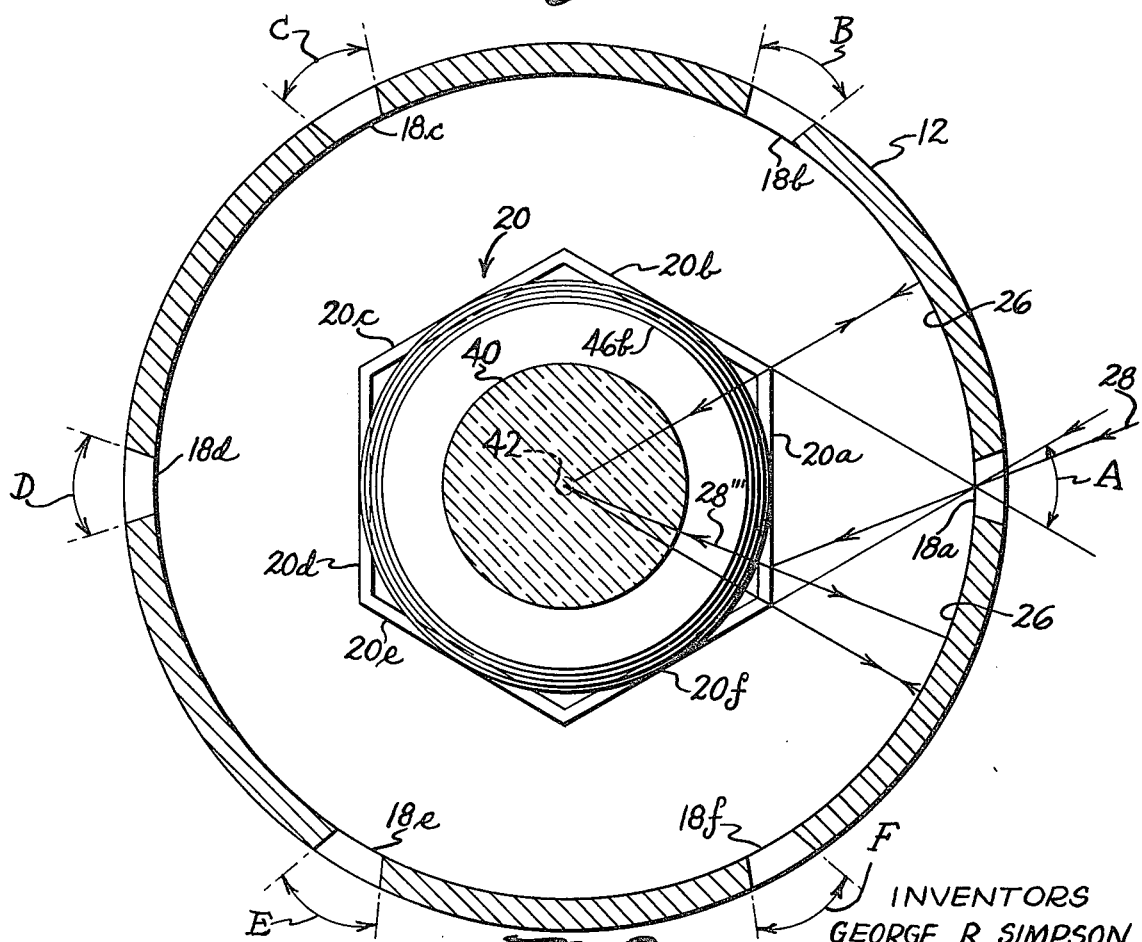
FIG. 2 is a cross-sectional view taken substantially upon section line 2—2 of FIG. 1 and looking in the direction of the arrows.

Referring to the drawing in detail and in particular to FIGS. 1 and 2, it will be seen that an intermediate portion of an elongated cylindrically shaped opaque main supporting housing of a missile, or the like, is indicated generally by the numeral 10 and within side wall portions 12 of this housing and between a pair of transverse partition walls 14 and 15 is located a chamber 16. In order to admit light from all parts of two different endless annular object fields outwardly of and surrounding this housing, or surrounding a longitudinal axis 17 extending centrally therethrough, the side wall portions 12 are provided with a single set of six similar small light apertures 18a, 18b, 18c, 18d, 18e and 18f, which are equally peripherally spaced from each other and also arranged to lie substantially in the same transverse plane.

While a single set of six light apertures has been indicated above for monitoring all parts of two different preselected endless annular object fields by each aperture being designed to "cover" or "view" a different 60° sector of each field, as indicated by azimuth angles A, B, C, D, E and F for the sectors of each field, it should be appreciated that the invention may be accomplished by a set having a different number of equally peripherally spaced apertures in the housing. From a practical standpoint, however, it will be appreciated that a limited number of openings within the range of 3 to 8 will generally be preferred; since in such cases, fewer reflective optical components will be required in the respective optical branches of the combined system, fewer transparent windows will be required for hermetically sealing the chamber when such is desired and fewer filter glasses will be needed should it be desired to admit at each opening only radiation within a selected wave length range.

As indicated in FIGS. 1 and 2, within the chamber 16 are two similar sets 20 and 21 of six outwardly facing plane mirrors arranged in hexahedral relation to each other and in equally spaced relation to the axis 17. The mirrors of set 20 are numbered 20a, 20b, 20c, 20d, 20e and 20f and the mirrors of set 21 are similarly numbered 21a–21f. Each mirror of each set is arranged to face and cooperate with a different associated light aperture in the housing and each is so longitudinally positioned within the housing and relative to its light aperture as to receive only light entering the housing at a preselected elevation angle and from a preselected object field. Thus, mirror 20a is disposed within the housing 10 so as to receive light rays from sector A of a first object field and entering aperture 18a at an elevation angle $L_1$ while mirror 21a, on the other hand, is so disposed in the housing as to receive light rays from sector A of a second object field and entering the housing through aperture 18a at an elevation angle $L_2$.

Each plane mirror of each set of mirrors 20 and 21, when considered in transverse section, is disposed half way between the plane of its light aperture in side wall portion 12 and the central longitudinal axis 17, and is of such size as to intercept all of the principal light rays from the object field aligned therewith and entering the housing through the associated aperture. Therefore, mirror 20a will intercept all of the principal light rays from the first object field which are within the horizontal angle A and enter the housing through aperture 18a and mirror 21a will intercept all of the light rays from the second object field which are within horizontal angle A and enter the housing through aperture 18a.

The arrangement is such that each plane mirror of each set 20 and 21 will form a virtual image of its associated light aperture substantially at the longitudinal axis 17 of the system and will reflect each principal ray which impinges thereon outwardly in such a manner as to travel in a radial plane containing also the axis 17.

Transversely disposed within the housing 10 adjacent the partitions 14 and 15 and arranged to face toward each other are two flat mirrors 22 and 23. These mirrors are each of circular outline, centrally perforated to fit closely about the hexahedral mirror arrangements 20 and 21 and have their outer edges terminate adjacent the polished or plated mirror-like cylindrically curved inner surface 26 of housing 10.

Thus, any principal light ray, such as ray 28, which enters aperture 18a at an elevation angle L1, will impinge upon plane mirror 20a and will be reflected outwardly therefrom within a radial plane containing axis 17. However, in so doing, this reflected light ray, as shown in FIG. 1 by portions 28′ and 28″, will impinge upon the flat transverse mirror 22 and will be reflected thereby and then upon the outer cylindrically-shaped mirror-like surface 26 while still travelling, as shown in FIG. 2, in said radial plane. From the cylindrical surface 26, this light ray 28 will again be reflected but this time it will travel back toward the center of the housing 10, as indicated by portion 28‴ while still continuing to travel in the same radial plane.

There is shown at 30 in FIG. 2 a refracting optical component which is circular in transverse section and is carried upon a central part of transverse partition 15. This component, however, when considered in each and every radial section therethrough, such as shown in FIG. 1, is of such a curvature that it will refract principal ray 28 (and other rays closely adjacent and parallel thereto) so as to strike a small photosensitive detecting element 32 carried by the component on its flat back or more remote surface 36. Dotted lines at opposite sides of ray 28 and parallel thereto are shown in FIG. 1 to indicate the approximate width of beam which will enter the light aperture and travel through the system so as to impinge upon refracting element 30 for refraction thereby onto the detector 32.

In like manner, if a similar principal ray, but from the other object field and entering the housing 10 through aperture 18a at the elevation angle $L_2$ is considered, such as light ray 38, it will be seen that this light ray will be similarly reflected. It will first be reflected by plane mirror 21a and since plane mirror 21a is likewise halfway between the plane of aperture 18a and axis 17, ray 38 will be reflected outwardly, and while travelling in a radial plane, will first impinge upon the transversely disposed flat mirror 23 and then upon the cylindrically curved mirror-like surface 26, as indicated by ray portions 38′ and 38″. Also after reflection at the cylindrical surface 26, this ray will still be travelling in the same radial plane and will impinge, as indicated by portion 36‴ in FIG. 1, upon a second refracting component 40 in such a manner as to be directed thereby onto a second photosensitive detecting element 42 carried upon the flat back surface 44 of component 40.

In the structural arrangement shown in FIGS. 1 and 2, the light paths from each pair of corresponding sectors of the first and second endless annular object fields cross each other as they enter the light aperture common to both (such as at aperture 18a) and cross a second time as they travel inwardly between and beyond the pair of plane mirrors (see mirrors 20a and 21a) associated with the corresponding light aperture. In order to exclude as much stray or unwanted light as possible from the innermost region of the chamber 16 and thus prevent this stray light from reaching and affecting the photosensitive elements 32 and 42, a circular light gate or aperture is provided within the housing and substantially at the location where the two light paths from the same light aperture cross for a second or subsequent time. This light gate is formed by a circular rilled collar 46a employed adjacent the upper edges of the plane mirrors of the lower set of mirrors 21 and by a second circular rilled collar 46b adjacent the lower edges of the upper set of plane mirrors 20. This light gate is given as small a width as practical in order to exclude as much stray light as convenient without reducing the light beams travelling to the detecting elements. By so locating the elements 46a and 46b, it is possible to use a gate which is only slightly wider than the width of a single beam.

In FIG. 3, a slightly different form of combined viewing and detecting system arranged to look at two different endless annular object fields is disclosed. This modified system has an advantage in that more of the stray or unwanted light entering the main housing 50 through any single light aperture of the set of light apertures, such as aperture 52a, is prevented from passing directly to the innermost part or region 54a of the chamber 54, the region where the refractive components 55 and 56 carrying photosensitive elements 57 and 58 are located.

The path which the principal light ray 60 from a first object after entering the housing 50 through aperture 52a and at an elevation angle $L_3$ is indicated in FIG. 3. This ray will first be reflected from the plane mirror 62 and then the cylindrical surface 64 so as to impinge on and be refracted by component 55 toward element 57. On the other hand, it is clear from the drawing that the light ray 66 from a second object field and entering the light aperture 52a at an elevation angle $L_4$ will first strike a transverse plane mirror 68 and then the plane mirror 62. From this mirror, it will be reflected to the cylindrical mirror surface 64 and then a second transversely disposed flat mirror 70 before reaching refractive optical component 56.

Thus, in this modification, the light rays from one object field will experience two reflections and from the other object field will experience four reflections before reaching their respective photosensitive elements. (In FIG. 1 each of the light rays from each object field experienced three reflections.) Nevertheless, the arrangement of parts in FIG. 3 is such that direct light is prevented from passing directly and without reflection to the refractive components. Also, it will be appreciated that a pair of circular collar-like members 72a and 72b are provided within the chamber 54 at the location where the light paths from the first and second object fields cross each other and that the members are spaced from each other an amount just sufficient to allow each beam to pass therebetween. Thus, a circular gate or aperture means is formed and serves in helping to exclude stray light from region 54a inwardly thereof.

The advantages of compactness and a single set of light apertures for monitoring two object fields, as well as the provision of a light gate or aperture means within the main supporting housing, can also be obtained by the modified arrangement shown in FIG. 4 wherein two spherically curved mirrors 80 and 81 are employed in place of the cylindrical and transverse flat mirrors in FIGS. 1 and 3. These two spherically curved mirrors are so disposed in the housing and with reference to a pair of plane mirrors 82a and 84a therein and an aperture 86a in the main supporting housing that light rays from the first and second object fields, having elevation angles $L_5$ and $L_6$, respectively, will after single reflections therefom impinge upon these spherical mirrors.

The set of light rays reflected from each spherical mirror will then be brought to a focus at an image plane located intermediate the spherical surface and the longitudinal axis 88 of the housing. In fact, the construction and arrangement of parts are such that these two sets of light rays from the two object fields will cross each other substantially at the common location in the housing where the images of both object fields are being formed. Accordingly, it has been found most desirable to take advantage of this condition and provide at this crossing location a circular light gate 90; said stop being formed in part by the circular collar 91a and in part by the circular collar 91b carried by the sets of plane mirrors adjacent thereto. The light rays passing beyond this location 90 are diverging rays but since they are travelling in proper directions to impinge upon the refracting components 92 and 94 respectively, these rays will be collected and refracted thereby onto the photosensitive detecting means 96 and 98 associated therewith.

In FIG. 5, a somewhat similar combined optical system is disclosed except that a more compact arrangement of parts in the interior of the main housing is accomplished, when compared with the system of FIG. 4, by the use of two additional transversely disposed plane mirrors 102 and 104 inwardly of the crossing location 106 and these two mirrors fold the light beams incident thereon back upon themselves in such a way that the associated refracting components 108 and 110 carrying detecting means 112 and 114 thereon may be disposed in closer relationship to each other.

Having described our invention, We claim:

1. In combination an opaque main supporting housing and a combined light-collecting and detecting system disposed within and surrounded by said main housing at a location intermediate its spaced opposite ends, said combined system comprising a single set of similar relatively small peripherally arranged light apertures in side wall portions of said main housing and appreciably spaced from each other in such a predetermined manner as to have each light aperture face outwardly in a different azimuthal direction, and jointly simultaneously admitting into said housing light from all parts of two different predetermined endless annular object fields outwardly of said housing and in concentric relation to a longitudinal axis extending centrally through said housing, a pair of relatively small photosensitive detecting elements disposed respectively at spaced axial locations in said main housing and each being arranged to detect any appreciable change in light intensity occurring at any location in the respective endless annular object field associated therewith, a pair of optical systems associated with each light aperture, and each optically aligned with a respective one of said spaced detecting elements, and each of said optical systems comprising a plurality of specularly reflecting surfaces including a plane surface and a curved surface in optical alignment with each other, said plane surface being positioned within said housing in a plane substantially parallel to the light aperture associated therewith and at a location substantially midway between the aperture associated therewith and said central longitudinal axis, said curved surface being a concavely curved surface having its center of curvature disposed substantially upon said longitudinal axis, said plane surface being so disposed in said housing and relative to the light aperture associated therewith as to intercept substantially all of the light rays from the object field aligned therewith which enter said housing, and to reflect same toward said curved surface, and said curved surface being so disposed in said system as to receive said reflected light rays and direct same inwardly as a convergent bundle of light rays generally toward the detecting element associated therewith, and a pair of positive lens elements centrally disposed within said housing, and each in optical contact with one of said detecting elements so as to collect the light rays travelling beyond the curved surface aligned therewith and to direct same onto said detecting element associated therewith.

2. The combination set forth in claim 1 and wherein each pair of optical systems associated with the same light aperture is so arranged in said housing as to cause the convergent bundles of light rays being directed inwardly thereby and toward said centrally disposed detecting elements to cross each other at a location substantially midway between the associated light aperture and said longitudinal axis.

3. The combination set forth in claim 1 and wherein each pair of optical systems associated with the same light aperture is so arranged in said housing as to cause the convergent bundles of light rays being directed inwardly thereby and toward said centrally disposed detecting elements to cross each other at a location substantially midway between the associated light aperture and said longitudinal axis, and a pair of opaque circular plates disposed in said housing in predetermined spaced relation to each other and at opposite sides of said convergent bundles of light rays at the location at which they cross so as to form a light gate therefor.

4. The combination set forth in claim 1 and wherein said concave surface of each optical system is a spherically curved surface serving to focus the light rays being reflected thereby at a focal plane substantially midway between said curved surface and the detecting element associated therewith, and a field stop of small predetermined dimension in the longitudinal direction of said housing and disposed substantially at said focal plane for limiting the width of annular object field being viewed by the associated detecting element.

5. The combination set forth in claim 1 and wherein said concave surface of each optical system is a spherically curved surface serving to focus the light rays being reflected thereby at a focal plane substantially midway between said surface and the detecting element associated therewith, and the light rays of each pair of optical systems cross each other substantially at a location common to both focal planes, and a pair of opaque circular plates disposed in said housing in predetermined spaced relation to each other adjacent said common location so as to form a field stop for both systems.

6. The combination set forth in claim 5 and wherein each optical system of each pair of optical systems comprises a plane mirror transversely disposed in said housing in such a manner as to intercept the light rays travelling beyond said common location and fold same back upon themselves before reaching the detecting element associated therewith, whereby a more compact optical assembly is obtained.

7. The combination set forth in claim 1 and wherein each optical system of each pair of optical systems comprises a plane mirror transversely disposed in said housing in such a manner as to intercept the light rays travelling therethrough and fold same back upon themselves before reaching the detecting element associated therewith, whereby a more compact optical assembly is obtained.

* * * * *